(12) United States Patent
Bhagat et al.

(10) Patent No.: US 11,630,256 B2
(45) Date of Patent: Apr. 18, 2023

(54) CUSTOMIZED POLYMER/GLASS DIFFRACTIVE WAVEGUIDE STACKS FOR AUGMENTED REALITY/MIXED REALITY APPLICATIONS

(71) Applicant: Magic Leap, Inc., Plantation, FL (US)

(72) Inventors: Sharad D. Bhagat, Austin, TX (US); Brian George Hill, Duxbury, MA (US); Christophe Peroz, San Francisco, CA (US); Chieh Chang, Cedar Park, TX (US); Ling Li, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/409,163

(22) Filed: Aug. 23, 2021

(65) Prior Publication Data

US 2021/0382221 A1 Dec. 9, 2021

Related U.S. Application Data

(62) Division of application No. 16/909,201, filed on Jun. 23, 2020, now Pat. No. 11,099,313.

(Continued)

(51) Int. Cl.
*G02B 27/01* (2006.01)
*F21V 8/00* (2006.01)

(52) U.S. Cl.
CPC ......... *G02B 6/0038* (2013.01); *G02B 6/0065* (2013.01); *G02B 6/0076* (2013.01); *G02B 27/0172* (2013.01); *G02B 2027/0112* (2013.01)

(58) Field of Classification Search
None
See application file for complete search history.

(56) References Cited

U.S. PATENT DOCUMENTS

| 8,986,922 B1 | 3/2015 | Wach |
| 9,915,826 B2 | 3/2018 | Tekolste et al. |

(Continued)

OTHER PUBLICATIONS

PCT International Search Report and Written Opinion in International Appln. No. PCT/US2020/039147, dated Sep. 30, 2020, 12 pages.

(Continued)

*Primary Examiner* — Chris H Chu
(74) *Attorney, Agent, or Firm* — Fish & Richardson P.C.

(57) ABSTRACT

A diffractive waveguide stack includes first, second, and third diffractive waveguides for guiding light in first, second, and third visible wavelength ranges, respectively. The first diffractive waveguide includes a first material having first refractive index at a selected wavelength and a first target refractive index at a midpoint of the first visible wavelength range. The second diffractive waveguide includes a second material having a second refractive index at the selected wavelength and a second target refractive index at a midpoint of the second visible wavelength range. The third diffractive waveguide includes a third material having a third refractive index at the selected wavelength and a third target refractive index at a midpoint of the third visible wavelength range. A difference between any two of the first target refractive index, the second target refractive index, and the third target refractive index is less than 0.005 at the selected wavelength.

12 Claims, 8 Drawing Sheets

Related U.S. Application Data

(60) Provisional application No. 62/865,808, filed on Jun. 24, 2019.

(56) References Cited

U.S. PATENT DOCUMENTS

| | | |
|---|---|---|
| 2006/0221448 A1 | 10/2006 | Nivon et al. |
| 2012/0195065 A1* | 8/2012 | Hyakuta ............. C09D 11/322 362/624 |
| 2015/0253487 A1 | 9/2015 | Nichol et al. |
| 2017/0124928 A1 | 5/2017 | Edwin et al. |
| 2017/0329075 A1* | 11/2017 | Yeoh ................... G02B 6/0016 |
| 2018/0275350 A1* | 9/2018 | Oh ......................... G02B 6/10 |
| 2018/0284460 A1* | 10/2018 | Cheng ............... G02B 27/0944 |
| 2018/0299678 A1* | 10/2018 | Singer .................... G02B 6/005 |
| 2019/0064526 A1* | 2/2019 | Connor ............... G02B 6/0073 |
| 2019/0187360 A1 | 6/2019 | Nichol et al. |
| 2020/0116997 A1* | 4/2020 | Lee ..................... G02B 6/0076 |
| 2020/0400870 A1 | 12/2020 | Bhagat et al. |

OTHER PUBLICATIONS

Extended European Search Report in European Appln. No. 20830720. 7, dated Jul. 26, 2022, 10 pages.

\* cited by examiner

US 11,630,256 B2

CUSTOMIZED POLYMER/GLASS DIFFRACTIVE WAVEGUIDE STACKS FOR AUGMENTED REALITY/MIXED REALITY APPLICATIONS

CROSS-REFERENCE TO RELATED APPLICATIONS

This application is a divisional of U.S. patent application Ser. No. 16/909,201 filed on Jun. 23, 2020, which claims the benefit of U.S. Patent Application No. 62/865,808 filed on Jun. 24, 2019, which are incorporated by reference herein in their entirety.

TECHNICAL FIELD

This invention relates to customized polymer/glass diffractive waveguide stacks with improved performance for augmented reality/mixed reality applications.

BACKGROUND

Augmented reality/mixed reality devices typically exploit a single type of glass or polymer material for all layers (e.g., red (R), green (G), and blue (B) layers). The overall performance of the device can be dictated by the performance of the RGB layers. Some key performance indicators, such as modulation transfer function (MTF), efficiency, field of view (FOV), contrast, and uniformity of an eyepiece depend on optical properties of the individual layers. These optical properties include refractive index, yellowness index, haze, optical transmission, surface roughness, and the like. For a given material, optical properties such as refractive index and optical transmission are a function of wavelength. See, for example, FIGS. 1A and 1B, which show typical dispersion curves (refractive index versus wavelength) for polymer waveguides, and FIG. 2, which shows typical optical absorption curves (optical transmission versus wavelength) for polymer waveguide materials. Other properties such as haze and yellowness index do not depend as heavily on wavelength. This particular relationship of waveguide materials with incident wavelength can impose challenges related to optical suitability if the refractive index and corresponding yellowness index values are above a certain threshold.

SUMMARY

In a first general aspect, a diffractive waveguide stack includes a first diffractive waveguide for guiding light in a first visible wavelength range and a second diffractive waveguide for guiding light in a second visible wavelength range. The first diffractive waveguide includes a first material and having a first yellowness index and a first refractive index at a selected wavelength, and the second diffractive waveguide includes a second material and having a second yellowness index and a second refractive index at the selected wavelength. A wavelength in the first visible wavelength range exceeds a wavelength in the second visible wavelength range, the first refractive index exceeds the second refractive index at the selected wavelength, and the first yellowness index exceeds the second yellowness index at the selected wavelength.

Implementations of the first general aspect may include one or more of the following features.

The diffractive waveguide stack of the first general aspect may include a third diffractive waveguide for guiding light in a third visible wavelength range. The third diffractive waveguide includes a third material and having a third yellowness index and a third refractive index at the selected wavelength. A wavelength in the second visible wavelength range exceeds a wavelength in the third visible wavelength range, and the second yellowness index exceeds the third yellowness index at the selected wavelength. The second refractive index may exceed the third refractive index at the selected wavelength. The first visible wavelength range includes red light, the second visible wavelength range includes green light, and the third visible wavelength range includes blue light. The first yellowness index is less than about 1.2, the second yellowness index is less than about 0.8, and the third yellowness index is less than about 0.4 at the selected wavelength.

In some cases, the first material includes a first polymer and the second material includes a second polymer. The first polymer and the second polymer may be different. In certain cases, the first material includes a first copolymer having a first monomer and a second monomer, and the second material includes a second copolymer having the first monomer and the second monomer. A ratio of the first monomer to the second monomer in the first copolymer may differ from a ratio of the first monomer to the second monomer in the second copolymer. The first material may include a first additive, and the second material may include a second additive. The first additive and the second additive can be the same, with a ratio of the first additive to the first polymer differing from a ratio of the second additive to the second polymer.

In some cases, the first material includes a first glass and the second material comprises a second glass. In certain cases, the first material comprises one of a polymer and a glass, and the second material comprises the other of a polymer and a glass.

In a second general aspect, a diffractive waveguide stack includes a first diffractive waveguide for guiding light in a first visible wavelength range, a second diffractive waveguide for guiding light in a second visible wavelength range, and a third diffractive waveguide for guiding light in a third visible wavelength range. The first diffractive waveguide includes a first material and having a first refractive index at a selected wavelength and a first target refractive index at a midpoint of the first visible wavelength range. The second diffractive waveguide includes a second material and having a second refractive index at the selected wavelength and a second target refractive index at a midpoint of the second visible wavelength range. The third diffractive waveguide includes a third material and having a third refractive index at the selected wavelength and a third target refractive index at a midpoint of the third visible wavelength range. The first visible wavelength range corresponds to red light, the second visible wavelength range corresponds to green light, and the third visible wavelength range corresponds to blue light. A difference between any two of the first target refractive index, the second target refractive index, and the third target refractive index is less than 0.005 at the selected wavelength.

In some implementations of the second general aspect, the selected wavelength is 589 nm.

In a third general aspect, fabricating diffractive waveguides for a waveguide stack includes combining a first monomer and a second monomer in a first ratio to yield a first polymerizable material, casting the first polymerizable material in a first diffractive waveguide mold and polymerizing the first polymerizable material to yield a first diffractive waveguide for guiding light in a first visible wavelength range, combining the first monomer and the second monomer in a second ratio to yield a second polymerizable material, and casting the second polymerizable material in a second diffractive waveguide mold and polymerizing the second polymerizable material to yield a second diffractive waveguide for guiding light in a second visible wavelength range. The first diffractive waveguide has a first yellowness index and a first refractive index at a selected wavelength, and the second diffractive waveguide has a second yellowness index and a second refractive index at the selected wavelength. A wavelength in the first visible wavelength range exceeds a wavelength in the second visible wavelength range, the first refractive index exceeds the second refractive index at the selected wavelength, and the first yellowness index exceeds the second yellowness index at the selected wavelength.

Implementations of the third general aspect may include one or more of the following features.

The third general aspect may further include combining the first monomer and the second monomer in a third ratio to yield a third polymerizable material, casting the third polymerizable material in a third diffractive waveguide mold, and polymerizing the third polymerizable material to yield a third diffractive waveguide for guiding light in a third visible wavelength range. The third diffractive waveguide has a third yellowness index and a third refractive index at the selected wavelength. A wavelength in the second visible wavelength range exceeds a wavelength in the third visible wavelength range, and the second yellowness index exceeds the third yellowness index at the selected wavelength. The second refractive index may exceed the third refractive index at the selected wavelength. In some cases, the selected wavelength is 589 nm.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure relates to the use of optically tuned materials for various color layers (e.g., RGB) in an augmented reality (AR)/mixed reality (MR) diffractive waveguide-based eyepiece to optimize the overall optical performance of the eyepiece. The material for each color waveguide can be tuned for optimal optical properties (refractive index, yellowness index, transmission) according to operating wavelength. Various implementations of glass and polymer-based waveguides configured to achieve optimal optical properties are described.

Figure 1A:
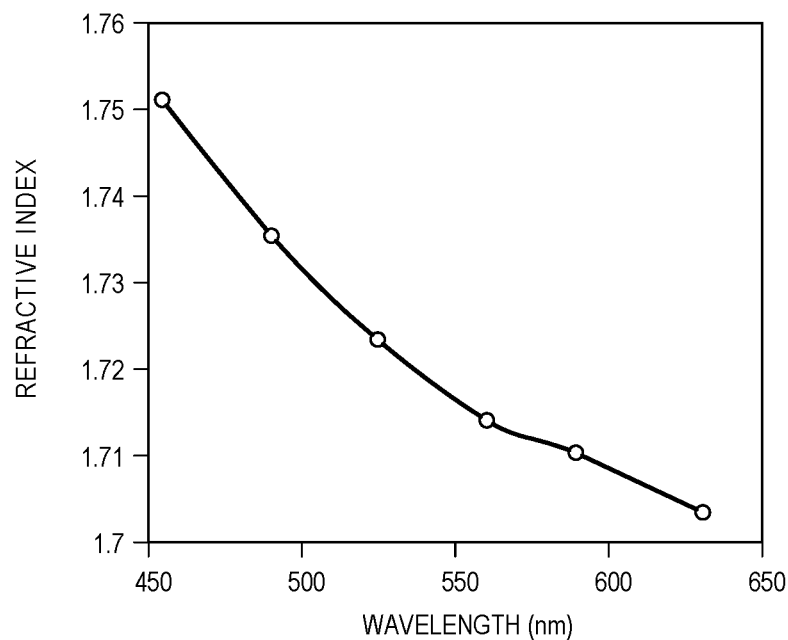
FIGS. 1A and 1B show typical dispersion curves for polymer waveguides.
Figure 1B:
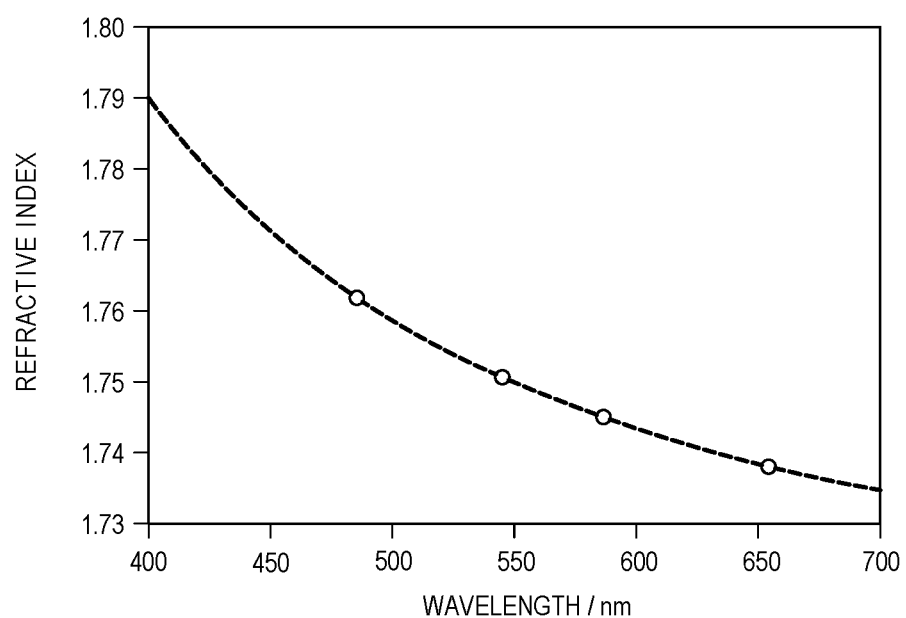
Figure 2:
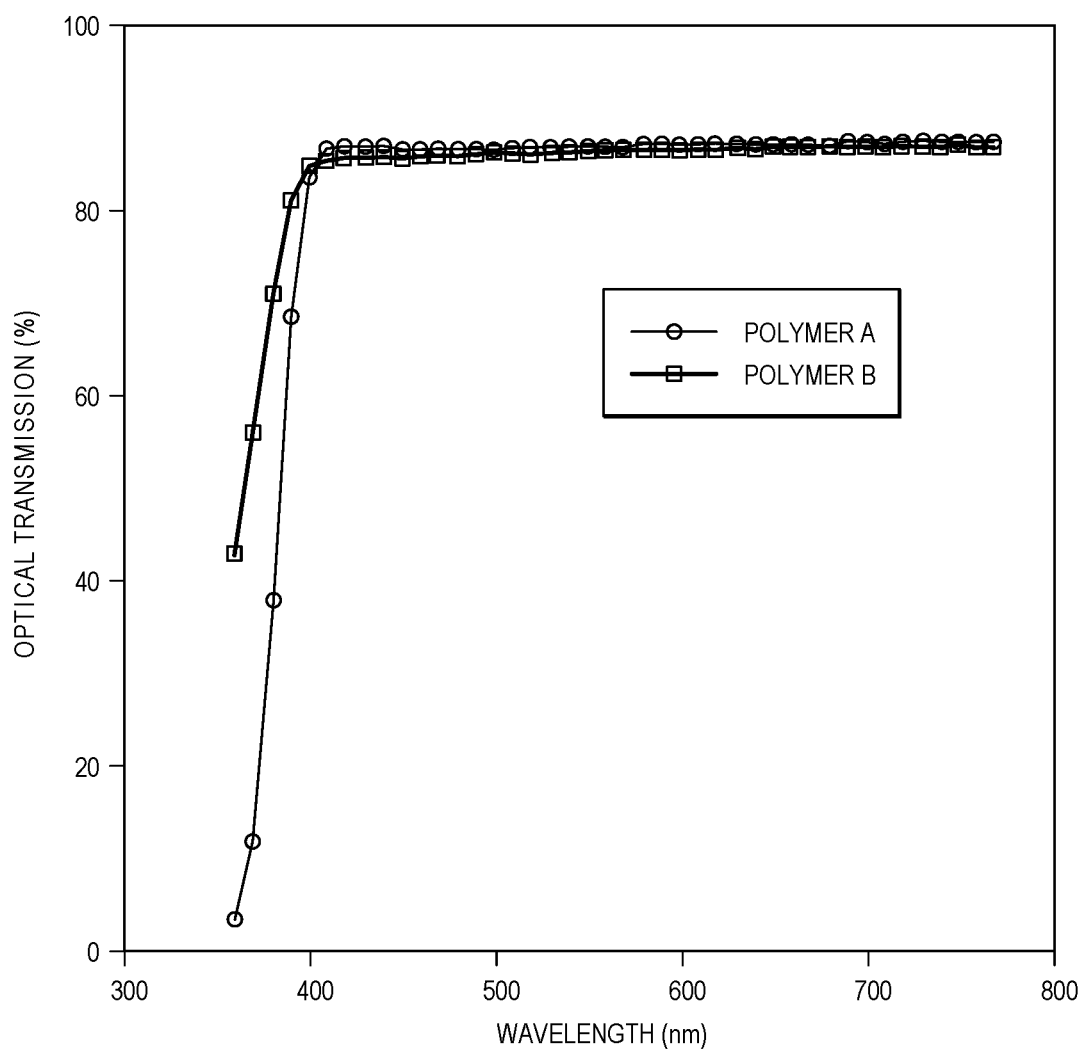
FIG. 2 shows typical optical absorption curves for waveguide materials.
Figure 3:
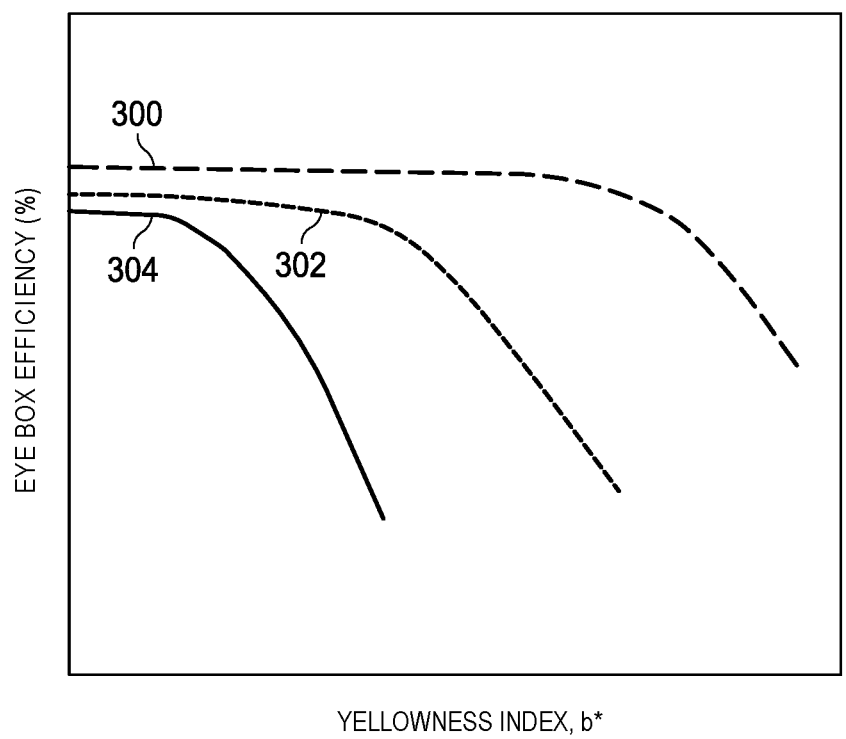
FIG. 3 shows a plot of efficiency versus yellowness index for red-green-blue (RGB) waveguides.

Differences in refractive indices (dispersion curve) for a given waveguide material at RGB wavelengths typically result in a different field of view (FOV) for each layer and can limit the overall FOV of a waveguide stack. In addition, materials with higher refractive indices (e.g., glass as well as polymers) tend to exhibit a greater yellowness index (b*), which is related to the optical transmission of a waveguide and overall efficiency of an eyepiece. Above a certain value of yellowness index ($b^*_{lim}$), the material absorption limits the overall efficiency of an eyepiece due at least in part to light absorption by the bulk of the waveguide. The threshold values of $b^*_{lim}$ are spectrally dependent: $b^*_{lim}$ is different for various colors (R, G, B, C, . . . ) in the order $B_{TH} < G_{TH} < R_{TH}$. That is, red layers can tolerate higher values of $b^*_{lim}$ compared to green and blue layers. FIG. 3 shows a schematic representation of threshold b* values for various colors based on eye box efficiency drop as the waveguide approaches $b^*_{lim}$, with plots 300, 302, and 304 corresponding to red, green, and blue, respectively. Thus, rather than using the same waveguide material for all three colors, an appropriate combination of refractive index and corresponding b* value may be selected for individual R, G, and B layers.

To demonstrate the dependency of eyepiece efficiency with b* and wavelength, the threshold values of b* for R, G and B polymer waveguides were obtained by fabricating all three waveguides in LUMIPLUS LPB-1102 polymer (available from Mitsubishi Gas Chemical) with refractive index of 1.71 at 589 and starting b* of 0.3. The waveguides were then exposed to an additional UV dose to induce higher yellowness in the waveguide, and efficiencies for each color were measured as a function of b*. The threshold values of b* were then extracted from the plots of efficiency versus b* for each color by locating the b* position on the plot where efficiencies start to decline noticeably.

There are various implementations for achieving a suitable combination of refractive index and yellowness index separately for R, G and B layers. A first implementation employs three different waveguide materials, each with a different base material composition. A second implementation employs the same base material for each waveguide and adjusts the chemical composition or synthetic conditions to alter the optical properties. A third implementation combines glass and polymer waveguides. For a higher operating wavelength (e.g. red color, 625 nm), a material with a higher refractive index and higher b* can be used, as the red wavelength is not as sensitive to higher b* values, and desired eyepiece efficiency can still be maintained due to low light absorption by the waveguide. For a lower operating wavelength (e.g. blue color, 455 nm), a material with a lower index at a selected wavelength (e.g., 589 nm) and lower b* can be used, as the refractive index will be higher at 455 nm, and lower b* helps to keep light absorption at the minimum and thereby promote eyepiece efficiency.

Materials with higher b* and higher refractive index are suitable for red and green waveguide layers. As such, material with a refractive index of 1.71 may not be an ideal choice for red and green waveguide materials, since the refractive indices at green (530 nm) and red (625 nm) wavelengths are lower than 1.75. As depicted in FIG. 3, $n_1 < n_2 < n_3$, and $Bb^* < Gb^* < Rb^*$, where Bb*, Gb*, and Rb* represent b* of the blue, green, and red layers, respectively.

Figure 4A:
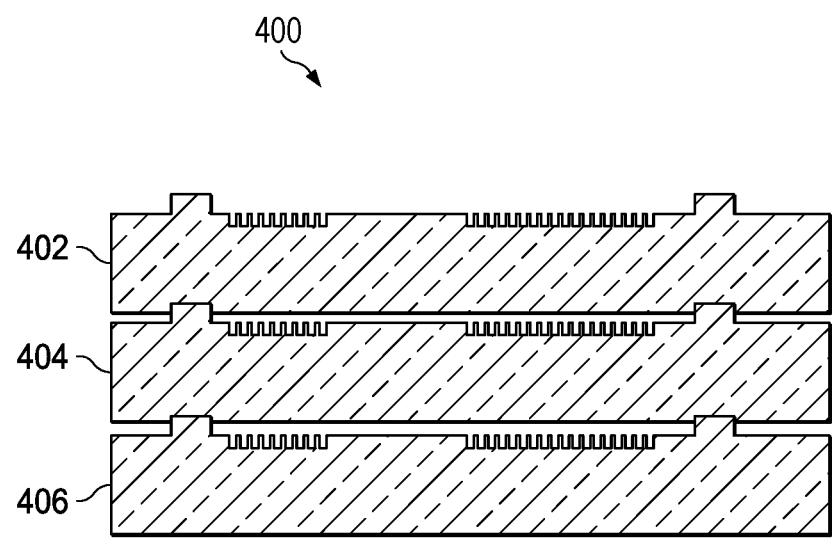
FIGS. 4A and 4B show RGB configurations based on three different base materials.
Figure 4B:
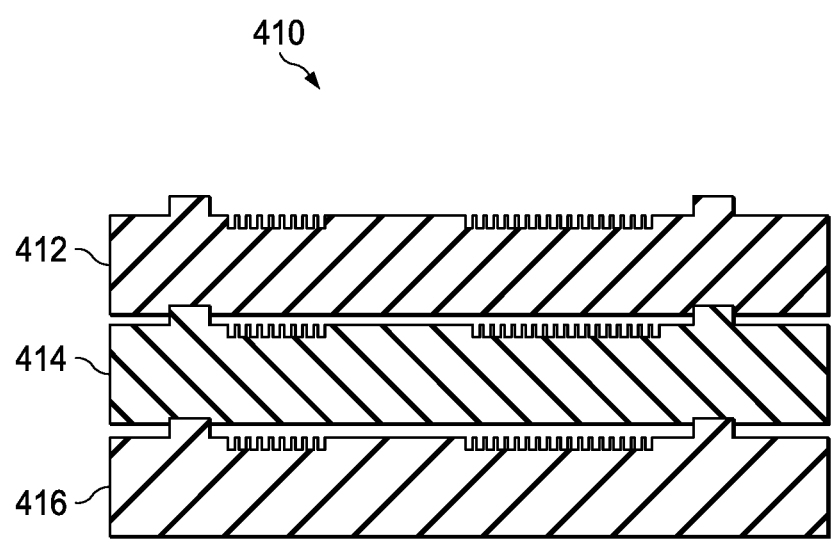

FIGS. 4A and 4B depict RGB waveguide stacks having RGB layers having a different base material for at least two of the layers. FIG. 4A depicts a RGB eyepiece stack 400 in which the red waveguide 402 is made of a first glass having a first refractive index, and the green and blue waveguides 404 and 406, respectively, are made of a second glass having second and third refractive indices, respectively, where the second and third refractive indices are different. In one example, the red waveguide is made of glass having a refractive index of 1.8 at 625 nm and b*<1.2; the green waveguide is made of glass having a refractive index of 1.8 at 530 nm and b*<0.8; and the blue waveguide is made of glass having a refractive index of 1.8 at 455 nm and b*<0.35. FIG. 4B depicts a RGB eyepiece stack 410 in which the red waveguide 412 is made of a first polymer having a first refractive index, the green waveguide 414 is made of a second polymer having a second refractive index, and the blue waveguide 416 is made of a third polymer having a third refractive index, where the first, second, and third polymers are different, and the first, second, and third refractive indices are different. For implementations depicted in FIG. 4B, optical polymers such as thiol-ene, polycarbonate, CR-39, PMMA, MR 167, MR174, and other appropriate polymers can be exploited to form a suitable combination of multi-color waveguide stacks for AR/MR application.

Figure 5A:
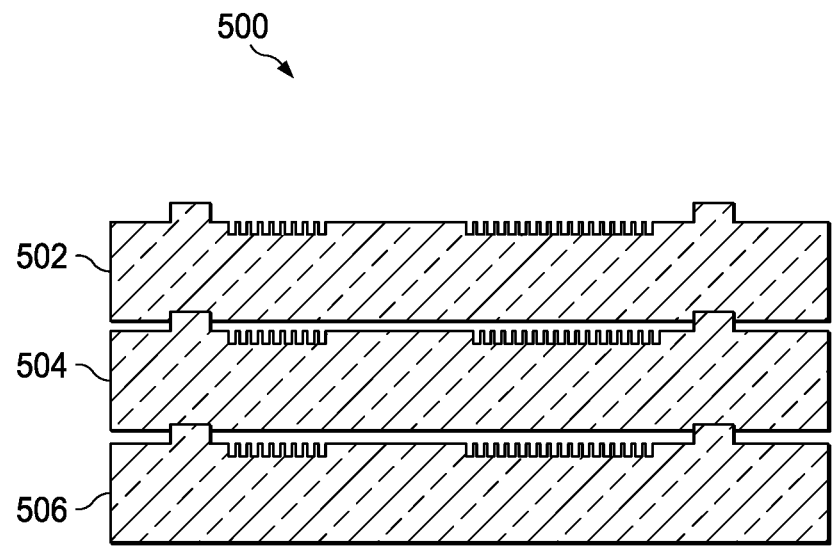
FIGS. 5A and 5B show RGB configurations based on the same base materials with different refractive indices.
Figure 5B:
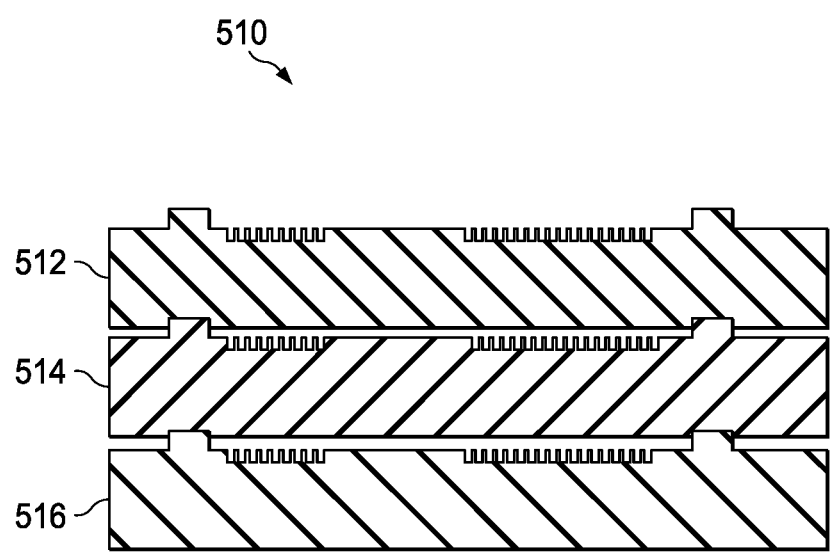

FIGS. 5A and 5B depict waveguide stacks having waveguides with different operating wavelengths (e.g., R, G, B, etc.) made of the same base glass or polymer material. A high index component can be combined with the base material, curing conditions can be selected, or both, to achieve a desired combination of refractive index and yellowness index for each color. FIG. 5A depicts a RGB waveguide stack 500 having the same base glass material for red waveguide 502, green waveguide 504, and blue waveguide 506. FIG. 5B depicts a RGB waveguide stack 510 having the same base polymer material for red waveguide 512, green waveguide 514, and blue waveguide 516. Each layer in the waveguide stacks of FIGS. 5A and 5B has a concentration of a high index component selected to achieve a suitable refractive index and yellowness index for each layer.

Figure 6A:
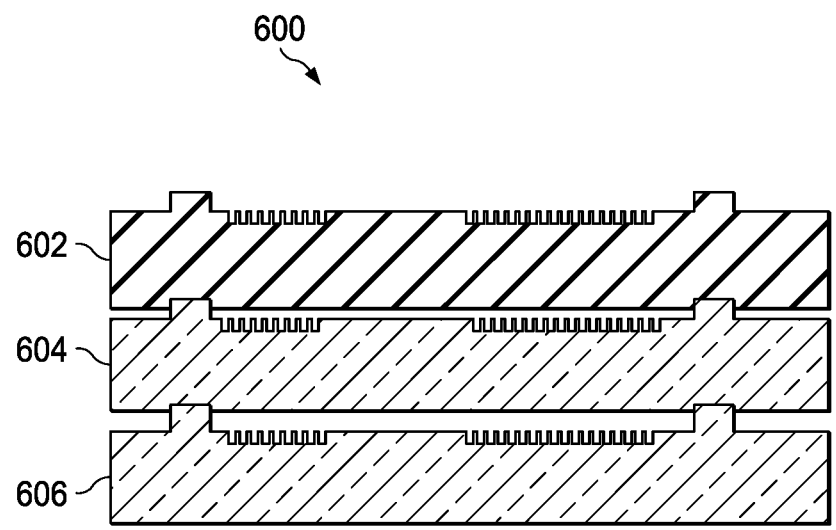
FIGS. 6A-6D show RGB configurations based on combinations of glass and polymer waveguides with different refractive indices.
Figure 6B:
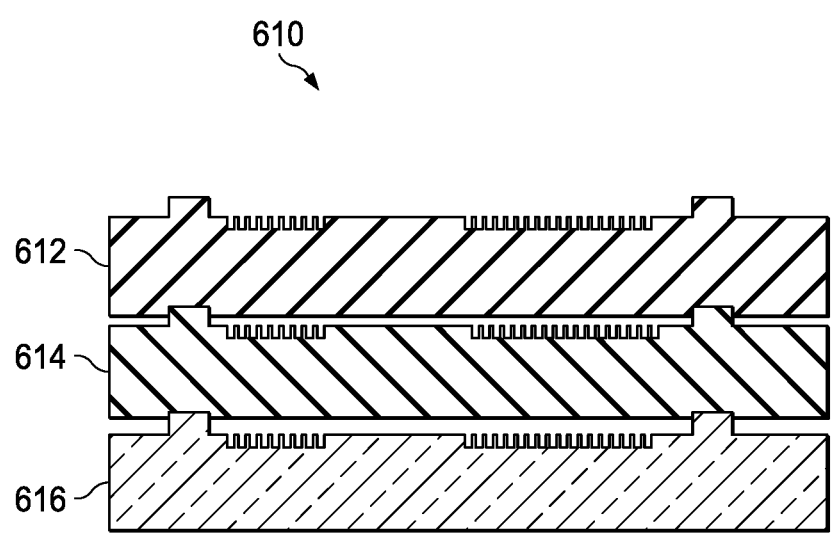
Figure 6C:
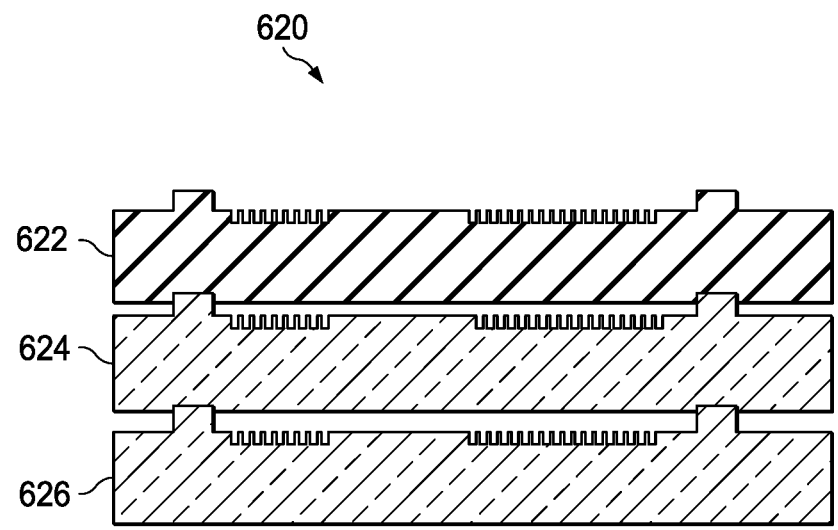
Figure 6D:
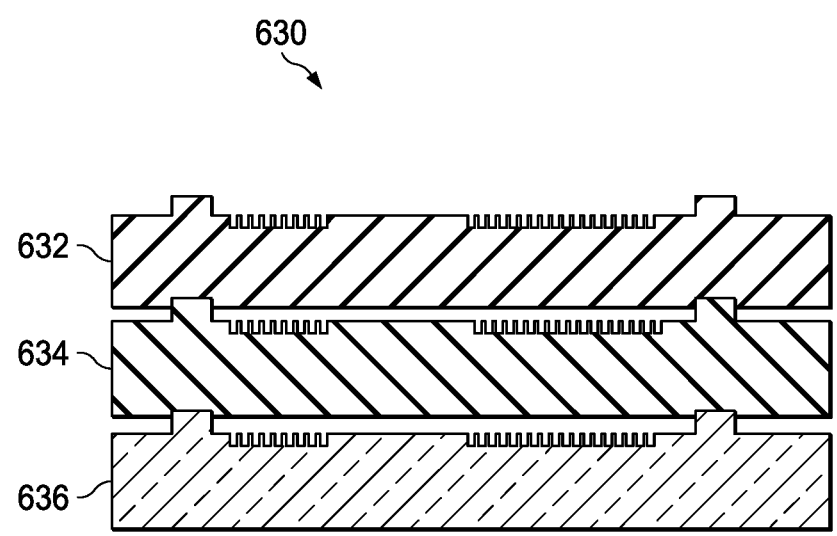

FIGS. 6A-6D depict waveguide stacks fabricated with a combination of glass and polymer waveguides with varying refractive indices. FIG. 6A depicts a RGB eyepiece stack 600 having red polymer waveguide 602 with refractive index $n_1$, green glass waveguide 604 with refractive index $n_2$, and blue glass waveguide 606, with refractive index $n_3$. FIG. 6B depicts a RGB eyepiece stack 610 having red polymer waveguide 612 with refractive index $n_1$, green polymer waveguide 614 with refractive index $n_2$, and blue glass waveguide 616 with refractive index $n_3$. FIG. 6C depicts a RGB eyepiece stack 620 having red polymer waveguide 622 with refractive index $n_1$, green glass waveguide 624 with refractive index $n_2$, and blue glass waveguide 626 with refractive index $n_3$. FIG. 6D depicts a RGB eyepiece stack 630 red polymer waveguide 632 with refractive index $n_1$, green polymer waveguide 634 with refractive index $n_2$, and blue glass waveguide 636 with refractive index $n_3$.

Figure 7:
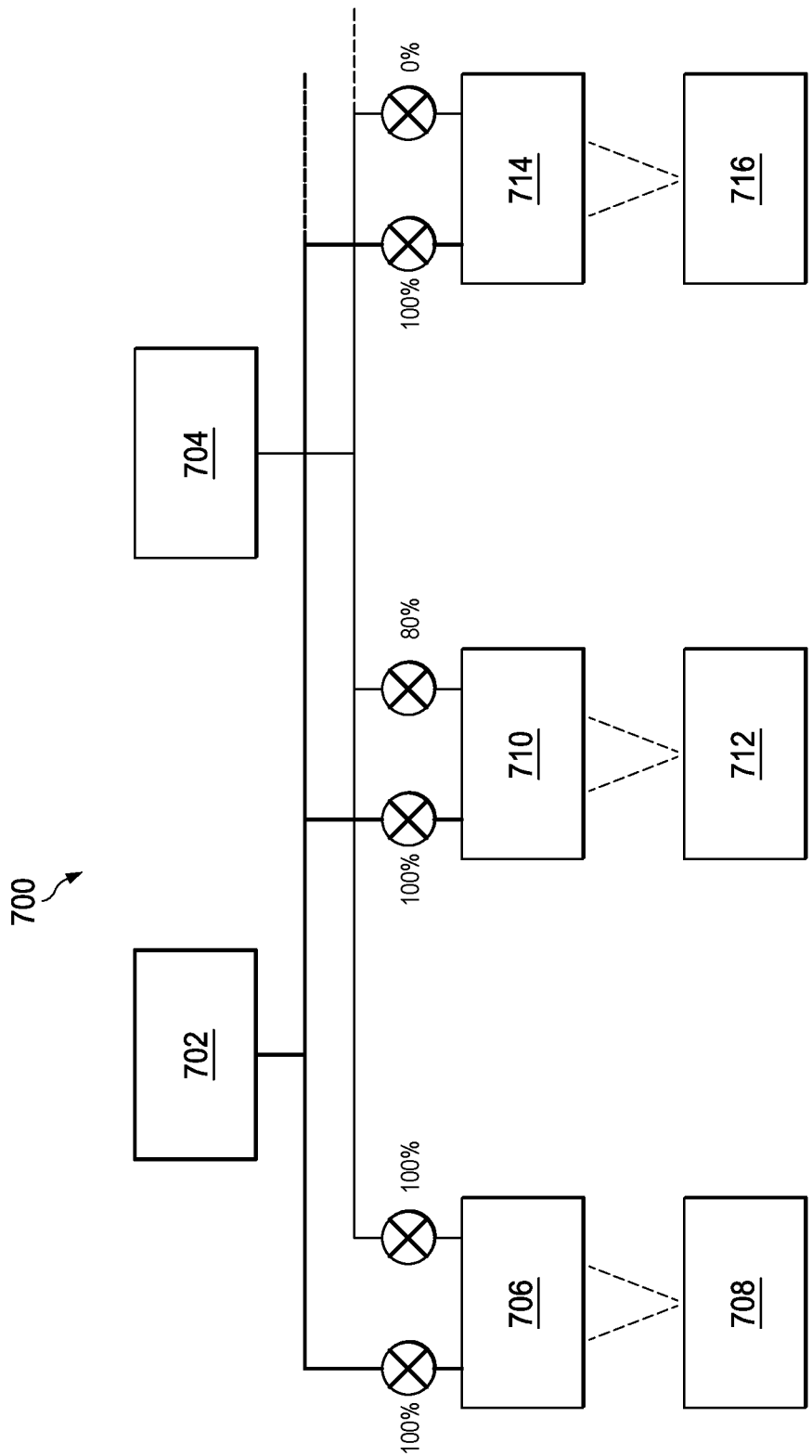
FIG. 7 depicts a multi-head system for fabricating RGB layers based on a two-part liquid resin.

Customized RGB polymer waveguides described herein can be fabricated with a multi-head system 700 as depicted in FIG. 7 using a two-part high index polymer resin, with the base resins 702 and 704 used for all three waveguides. The desired refractive and yellowness indices can be achieved by selectively controlling the relative amounts of base resins 702 and 704 dispensed and combined. This approach allows rapid and efficient high volume fabrication.

In one example, as depicted in FIG. 7, base resin 702 and 704 are provided in a 1:1 ratio to red layer mixer 706. The resulting mixture is provided to red layer casting head 708 and used to form a red waveguide for a RGB eyepiece stack. Base resin 702 and 704 are provided in a 1:0.8 ratio to green layer mixer 710. The resulting mixture is provided to green layer casting head 712 and used to form a green waveguide for the RGB eyepiece stack. Base resin 704 is provided to blue layer mixer 714 without base resin 702. Base resin 704 from blue layer mixer 714 is provided to blue layer casting head 716 and used to form a blue waveguide for the RGB eyepiece stack. Different ratios of base resins 702 and 704 can be used in other examples.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of fabricating diffractive waveguides for a waveguide stack, the method comprising:
    combining a first monomer and a second monomer in a first ratio to yield a first polymerizable material;
    casting the first polymerizable material in a first diffractive waveguide mold and polymerizing the first polymerizable material to yield a first diffractive waveguide for guiding light in a first visible wavelength range, wherein the first diffractive waveguide has a first yellowness index and a first refractive index at a selected wavelength;
    combining the first monomer and the second monomer in a second ratio to yield a second polymerizable material; and
    casting the second polymerizable material in a second diffractive waveguide mold and polymerizing the second polymerizable material to yield a second diffractive waveguide for guiding light in a second visible wavelength range, wherein the second diffractive waveguide has a second yellowness index and a second refractive index at the selected wavelength, wherein:
a wavelength in the first visible wavelength range exceeds a wavelength in the second visible wavelength range,
the first refractive index exceeds the second refractive index at the selected wavelength, and
the first yellowness index exceeds the second yellowness index at the selected wavelength.

2. The method of claim 1, further comprising:
combining the first monomer and the second monomer in a third ratio to yield a third polymerizable material; and
casting the third polymerizable material in a third diffractive waveguide mold and polymerizing the third polymerizable material to yield a third diffractive waveguide for guiding light in a third visible wavelength range, wherein the third diffractive waveguide has a third yellowness index and a third refractive index at the selected wavelength,
wherein:
a wavelength in the second visible wavelength range exceeds a wavelength in the third visible wavelength range, and
the second yellowness index exceeds the third yellowness index at the selected wavelength.

3. The method of claim 2, wherein the second refractive index exceeds the third refractive index at the selected wavelength.

4. The method of claim 1, wherein the selected wavelength is 589 nm.

5. The method of claim 1, wherein casting the first polymerizable material comprises providing the first polymerizable material to a first casting head, the second polymerizable material comprises providing the second polymerizable material to a second casting head.

6. The method of claim 5, wherein the first casting head and the second casting head are different.

7. The method of claim 1, wherein casting the first polymerizable material and the second polymerizable material comprises providing the first polymerizable material and the second polymerizable material to a multi-head casting system.

8. The method of claim 7, wherein the multi-head casting system comprises a first casting head and a second casting head, and the first casting head and the second casting head are different.

9. The method of claim 1, wherein the first ratio and the second ratio are different.

10. The method of claim 1, further comprising selecting first conditions for polymerizing the first polymerizable material and second conditions for polymerizing the second polymerizable material yields a first combination of the first refractive index and the first yellowness index and a second combination of the second refractive index and the second yellowness index, wherein first conditions differ from the second conditions, and the first combination differs from the second combination.

11. The method of claim 1, wherein polymerizing the first polymerizable material, the second polymerizable material, or both yields a thiol-ene or a polycarbonate.

12. The method of claim 1, further comprising superimposing the first diffractive waveguide and the second diffractive waveguide to yield a waveguide stack.

* * * * *